(12) United States Patent
Nakayama et al.

(10) Patent No.: US 11,449,699 B2
(45) Date of Patent: Sep. 20, 2022

(54) INFORMATION CODE READING SYSTEM

(71) Applicant: DENSO WAVE INCORPORATED, Aichi-pref. (JP)

(72) Inventors: Shin Nakayama, Chita-gun (JP); Takao Ushijima, Chita-gun (JP); Masahiko Sato, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/406,725

(22) Filed: Aug. 19, 2021

(65) Prior Publication Data

US 2021/0383088 A1 Dec. 9, 2021

Related U.S. Application Data

(63) Continuation of application No. PCT/JP2020/001797, filed on Jan. 21, 2020.

(30) Foreign Application Priority Data

Mar. 4, 2019 (JP) .............................. JP2019-038499

(51) Int. Cl.
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .......................... G06K 7/1417; G06K 19/0603
See application file for complete search history.

(56) References Cited

FOREIGN PATENT DOCUMENTS

| CN | 105518745 A | * | 4/2016 | ....... G06K 19/06037 |
|---|---|---|---|---|
| JP | 2006-195912 A | | 7/2006 | |
| JP | 2007-049584 A | | 2/2007 | |
| JP | 2007-079781 A | | 3/2007 | |
| JP | 4058478 B2 | * | 3/2008 | |
| JP | 5187383 B2 | * | 4/2013 | |
| JP | 2016-062260 A | | 4/2016 | |
| JP | 6361406 B2 | * | 7/2018 | |

* cited by examiner

*Primary Examiner* — Laura A Gudorf
(74) *Attorney, Agent, or Firm* — Oliff PLC

(57) ABSTRACT

An information code reading system including an information code display device and an information code reading device. The information code display device generates, corresponding to an information code to be displayed, multiple partial code images to be different from one another. A code area of the information code to be displayed includes multiple cells and each cell is included in at least one of the multiple partial code images. Each partial code image is generated by removing a part of the cells from the code area to be different from one another. The multiple partial code images are displayed on a display screen in a cyclic manner. The information code reading device captures, as an information code, an image of the display screen with an exposure time set to be longer than a cycle of cyclic display of the multiple partial code images, and decodes the captured information code.

8 Claims, 17 Drawing Sheets

INFORMATION CODE READING SYSTEM

CROSS REFERENCE TO RELATED APPLICATIONS

The present application is a continuation application of International Patent Application No. PCT/JP2020/001797 filed on Jan. 21, 2020, which designated the U.S. and claims the benefit of priority from Japanese Patent Application No. 2019-038499 filed on Mar. 4, 2019. The entire disclosures of all of the above applications are incorporated herein by reference.

TECHNICAL FIELD

The present disclosure relates to an information code reading system that reads an information code.

BACKGROUND

Conventionally, an information code reading system in which an information code reading device reads an information code displayed on a screen of an information code display device.

SUMMARY

The present disclosure provides an information code reading system including an information code display device and an information code reading device. The information code display device is configured to: generate, corresponding to an information code to be displayed, multiple partial code images to be different from one another, a code area of the information code to be displayed including multiple cells and each cell is included in at least one of the multiple partial code images, each partial code image being generated by removing a part of the cells from the code area, and the part of the cells being removed being set to be different from one another among the multiple partial code images; and display the generated multiple partial code images on a display screen in a cyclic manner with the code area as a reference. The information code reading device is configured to: capture, as an information code, an image of the display screen with an exposure time set to be longer than a cycle of cyclic display of the multiple partial code images; and decode the captured information code.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
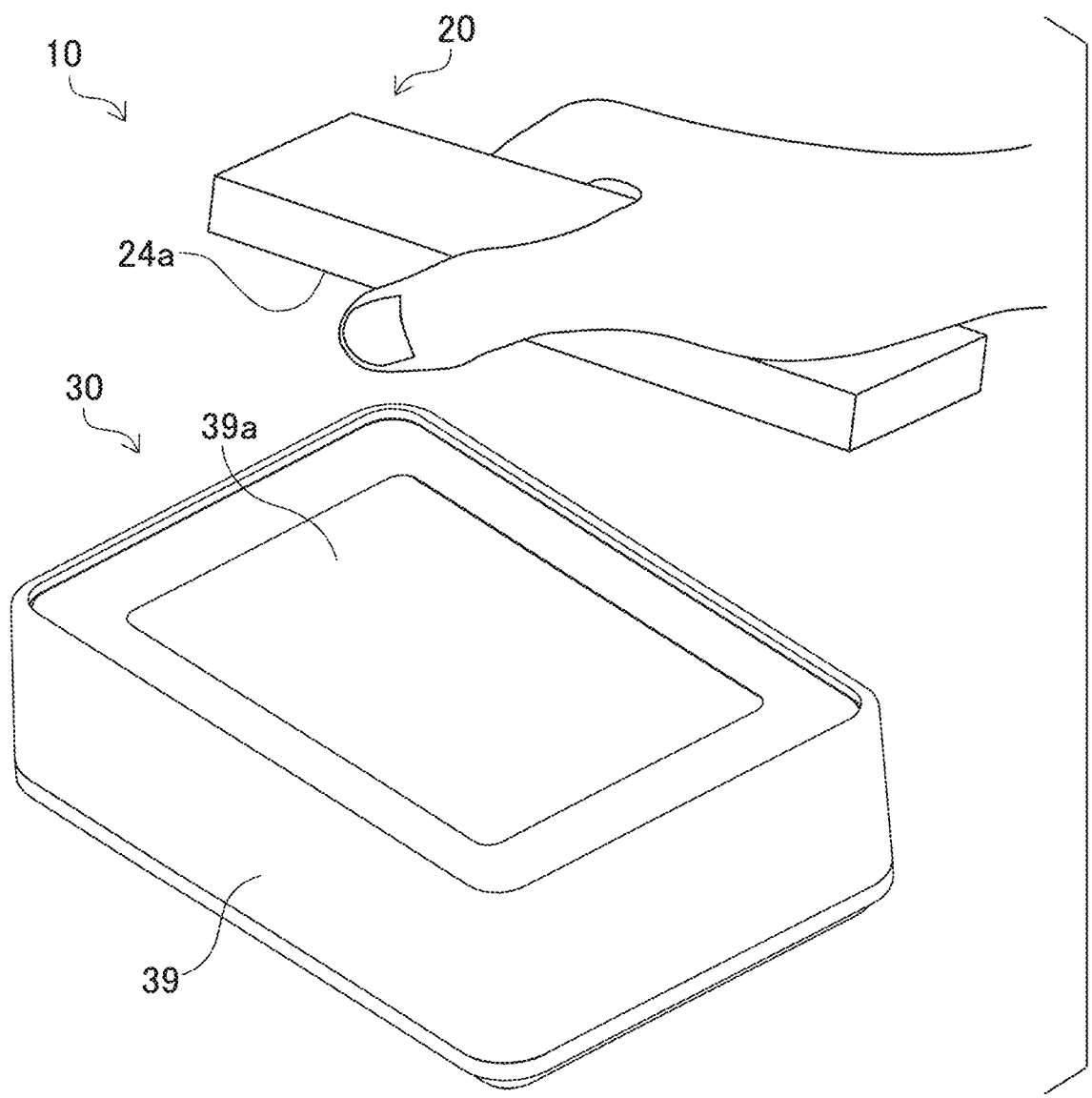
FIG. 1 is a diagram showing a schematic configuration of an information code reading system according to a first embodiment.

Before describing embodiments of the present disclosure, known information code reading system in which an information code reading device reads an information code using information displayed on a screen of an information code display device will be described.

Information codes such as barcodes and QR codes (registered trademarks) are used in various areas for various purposes. For example, by capturing an image and optically reading an information code displayed on a screen with a mobile terminal equipped with a camera, it is possible to easily acquire predetermined information recorded in the information code. In a use example, an encrypted information code is distributed to a user in advance. When the user presents the information code on the screen, for example, in a store, the user can receive a service corresponding to the information code, the user can be identified corresponding to the information code, or the information code can be used as a prepaid card in a prepaid payment system.

In the above configuration, when the screen displaying the information code is illegally photographed by a third party, the information code is easily duplicated, and this may cause a risk in terms of security and system operational safety. For example, when a QR code assigned with financial information is photographed and duplicated, the financial information may be used illegally. For another example, when the QR code for authentication is photographed and duplicated, the authentication information may be used illegally.

With consideration of the safety risk, in a known technology, a two-dimensional code is divided and the divided parts are displayed on a display screen. Specifically, the two-dimensional code is divided into multiple division codes. Thus, when one or partial division codes are photographed, the information of the two-dimensional code cannot be acquired. However, when one information code is simply divided into multiple division codes, the original information code may be restored by simply capturing image and synthesizing all of the division codes.

According to an aspect of the present disclosure, an information code reading system including an information code display device and an information code reading device is provided. The information code display device includes: a partial code image generation unit configured to generate, corresponding to an information code to be displayed, multiple partial code images to be different from one another, wherein a code area of the information code to be displayed includes multiple cells and each cell is included in at least one of the multiple partial code images, each partial code image is generated by removing a part of the cells from the code area, and the part of the cells being removed is set to be different from one another among the multiple partial code images; and a display unit configured to display the multiple partial code images generated by the partial code image generation unit on a display screen in a cyclic manner with the code area as a reference. The information code reading device includes: an image capturing unit capturing, as an information code, an image of the display screen with an exposure time set to be longer than a cycle of cyclic display of the multiple partial code images; and a decoding unit decoding the information code captured by the image capturing unit.

With the above configuration according to the present disclosure, the partial code image generation unit of the information code display device generates multiple partial code images to be different from one another. Specifically, each partial code image is generated by removing certain cells from the information code to be displayed, and the certain cells removed from the information code to be displayed is set to be different from one another. Each cell of the information code to be displayed is included at least one of the partial code images. The display unit displays the multiple partial code images on the display screen with the code area as a reference in cyclic manner. In the information code reading device, the image capturing unit captures an image of the display screen with the exposure time longer than the cycle of the cyclic display. Then, the decoding unit decodes and read the information code captured by the image capturing unit.

When the display screen of the information code display device is simply photographed by an image capturing device, only one partial code image is captured and the whole information code is not captured. In the above configuration, the information code reading device photographs the display screen with an exposure time longer than the cyclic cycle. Thus, an image in which entire partial code images overlap with one another can be obtained. Since the information code to be displayed is formed in the code area of the captured images, the information code can be read regardless of the cyclic display speed. Therefore, duplication of the information code displayed on the screen can be prevented.

First Embodiment

The following will describe an information code reading system according to a first embodiment of the present disclosure with reference to the accompanying drawings.

The information code reading system 10 according to the present embodiment is configured to prevent duplication of information code displayed on a screen. The information code reading system 10 includes an information code display device 20 configured to display an information code, and an information code reading device 30 configured to read the information code using information displayed on the information code display device 20.

The information code display device 20 will be described with reference to FIG. 2 to FIG. 4C.

Figure 2:
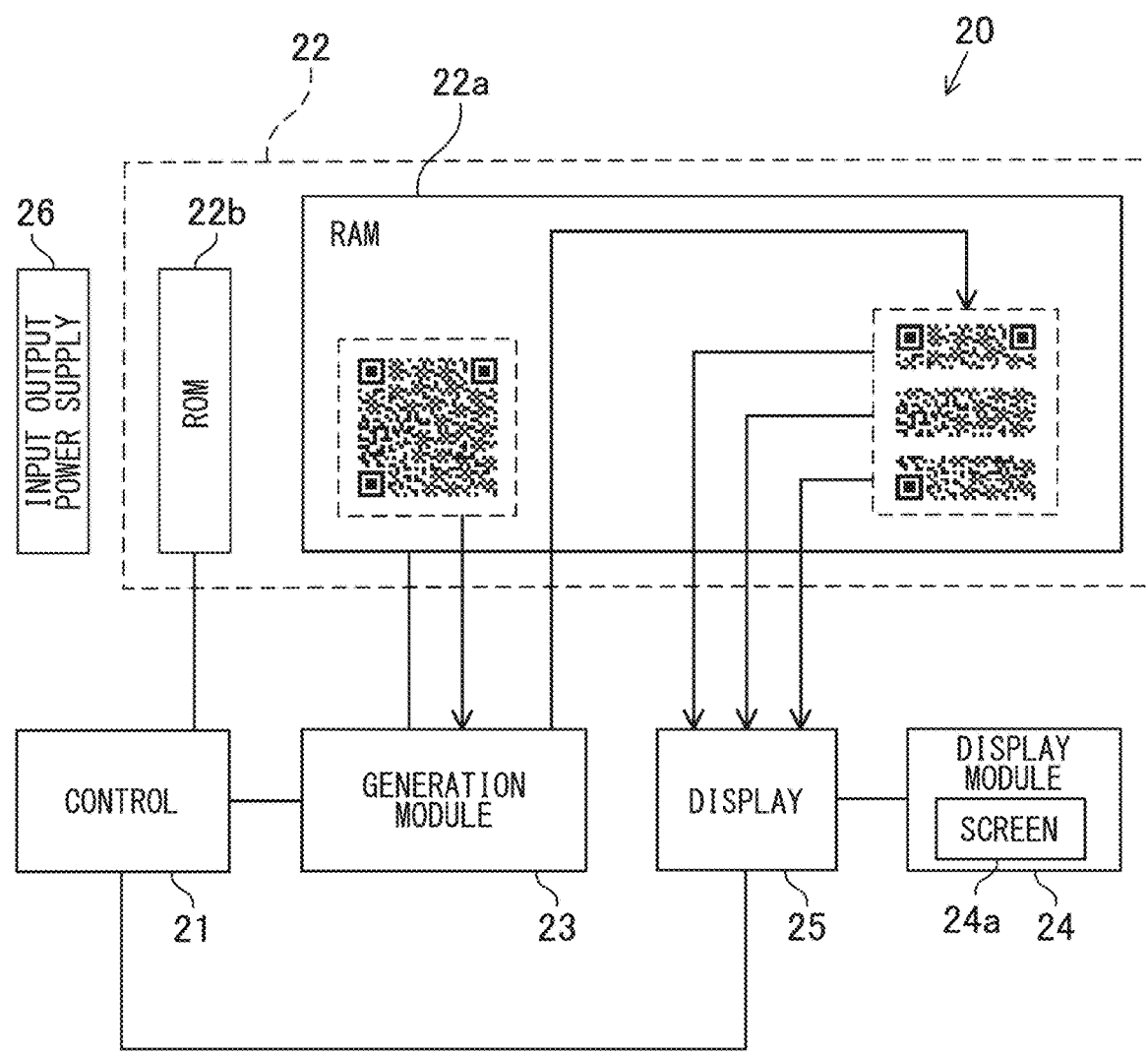
FIG. 2 is a block diagram schematically showing an electrical configuration of an information code display device shown in FIG. 1.

The information code display device 20 according to the present embodiment is a portable information terminal carried by a user, and is used to display each partial code image in various place. For example, the information code display device 20 may be provided by a smartphone to which a predetermined application program is installed. As shown in FIG. 2, the information code display device 20 includes; a control unit 21 that performs an overall control; a storage unit 22 including a RAM 22a, a ROM 22b, and the like; a drawing frame generation module 23; a display module 24; and a display controller 25.

The control unit 21 is provided by a microcomputer capable of controlling entire parts of the information code display device 20. The control unit 21 includes a CPU, a system bus, an input output interface, and the like. The control unit 21 controls various electrical components by performing arithmetic operations, logical operations, and display process based on a predetermined program stored in the ROM 22b.

The RAM 22a includes a working area for the control unit 21 to be used in execution of each process, such as arithmetic operations or logical operations. The RAM 22a includes an image data storage area for storing partial code images and the like. The ROM 22b stores, in advance, a predetermined program capable of executing a display process for cyclically displaying partial code images, a system program capable of controlling each hardware component of the system, and the like.

The drawing frame generation module 23 is controlled by the control unit 21, and generates different images of partial codes in each of which one or more cells constituting a code area of the information code are removed from the whole image of the information code to be displayed. Hereinafter, the image of partial code is simply referred to as a partial code image. In the present embodiment, the drawing frame generation module 23 generates multiple types of partial code images so that a range of each partial code image after excluding the one or more cells is different from one another and each cell configuring the information code is included in at least one of the partial code images.

Figure 3:
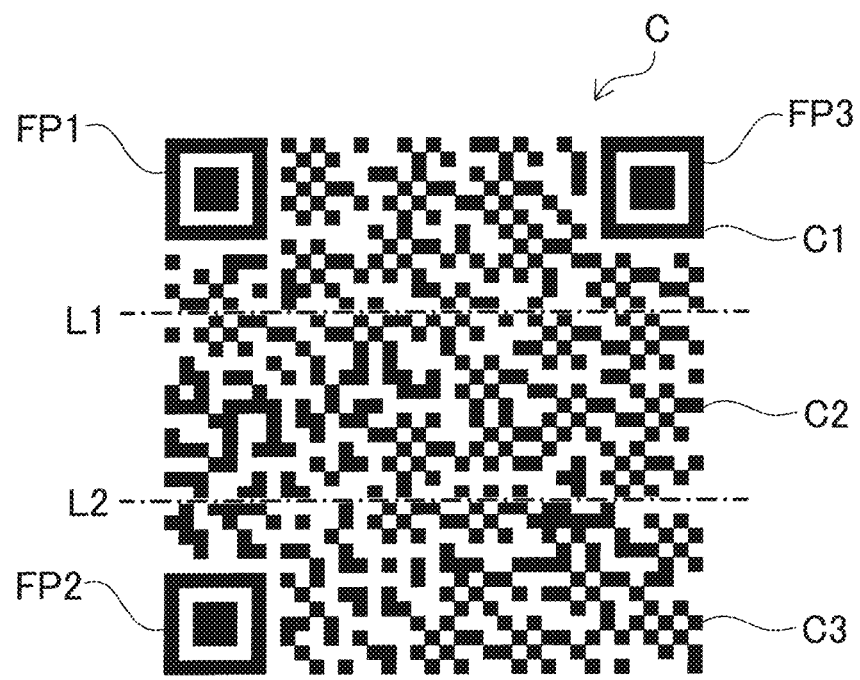
FIG. 3 is a diagram showing a relationship between a QR code and partial codes.

Specifically, when the QR code C illustrated in FIG. 3 is stored in the RAM 22a as the information code required to be displayed, the drawing frame generation module 23 divides the QR code C into three equal parts, for example, in vertical direction, thereby generating three partial codes C1 to C3. That is, the partial code C1 is generated by removing the partial codes C2 and C3 from the QR code C. The partial code C2 is generated by removing the partial codes C1 and C3 from the QR code C. The partial code C3 is generated by removing the partial codes C1 and C2 from the QR code C. Among three finder patterns (position detection patterns) FP1 to FP3 of the QR code C, the finder patterns FP1 and FP3 are included in the partial code C1, and the finder pattern FP2 is included in the partial code C3. In FIG. 3, the lines that divide the QR code into three equal parts are indicated by reference symbols L1 and L2.

In the present embodiment, a QR code having a general error correction function is adopted as the information code to be displayed. The QR code is generated to correct general errors. For example, in each cell configuring a data portion of the QR code, absence of an area within an error correctable range (for example, 30%) can be restored to be readable by the general error correction function. Therefore, the partial codes C1 to C3 are divided so that a size of each partial code is greater than the error correctable range, thereby preventing the QR code from being readable by the general error correction function.

The drawing frame generation module 23 generates partial code images to respectively including the partial codes generated as described above. For example, when the QR code C is divided into three equal parts and three partial codes C1 to C3 are generated as described above, the drawing frame generation module 23 generates a partial code image P11 to include the partial code C1 (see FIG. 4A), a partial code image P12 to include the partial code C2 (see FIG. 4B), and a partial code image P13 to include the partial code C3 (see FIG. 4C).

Figure 4A:
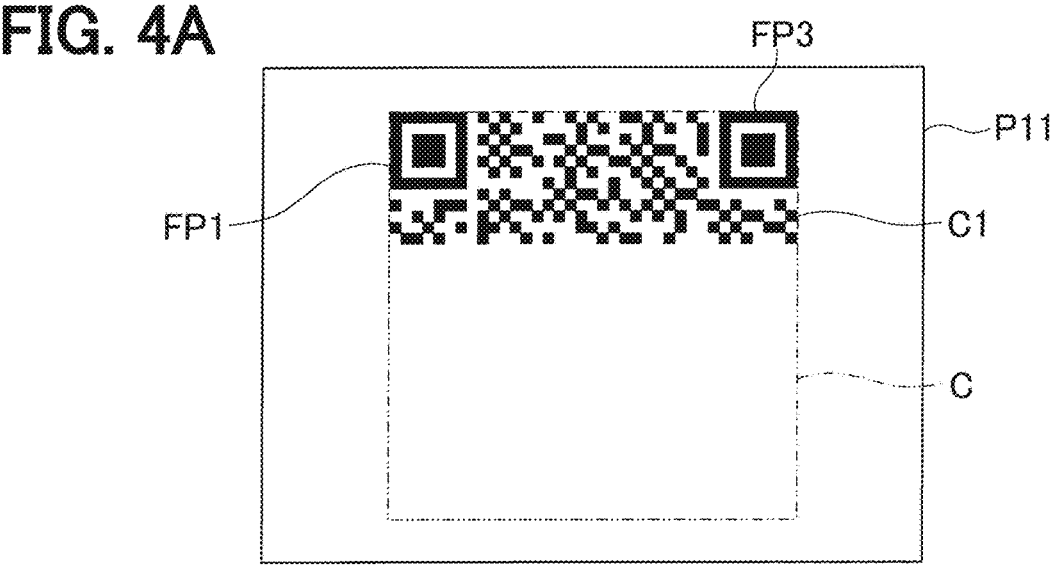
FIG. 4A is a diagram showing a partial code image including a partial code according to the first embodiment.
Figure 4B:
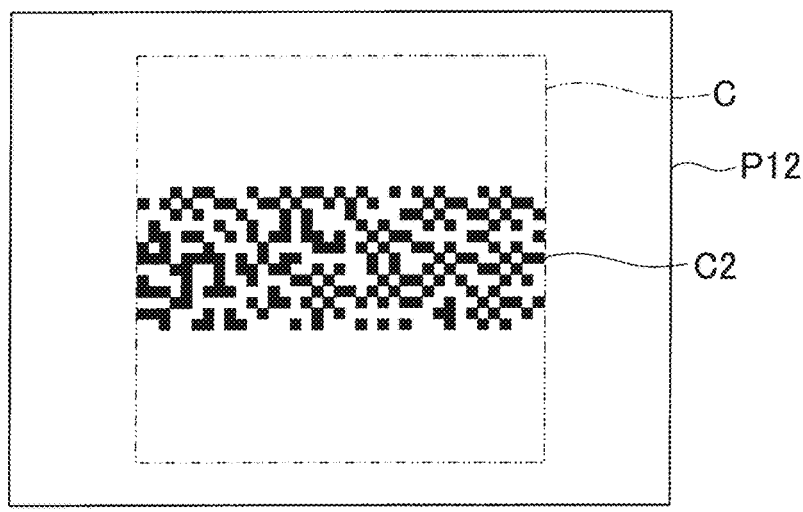
FIG. 4B is a diagram showing another partial code image including another partial code.
Figure 4C:
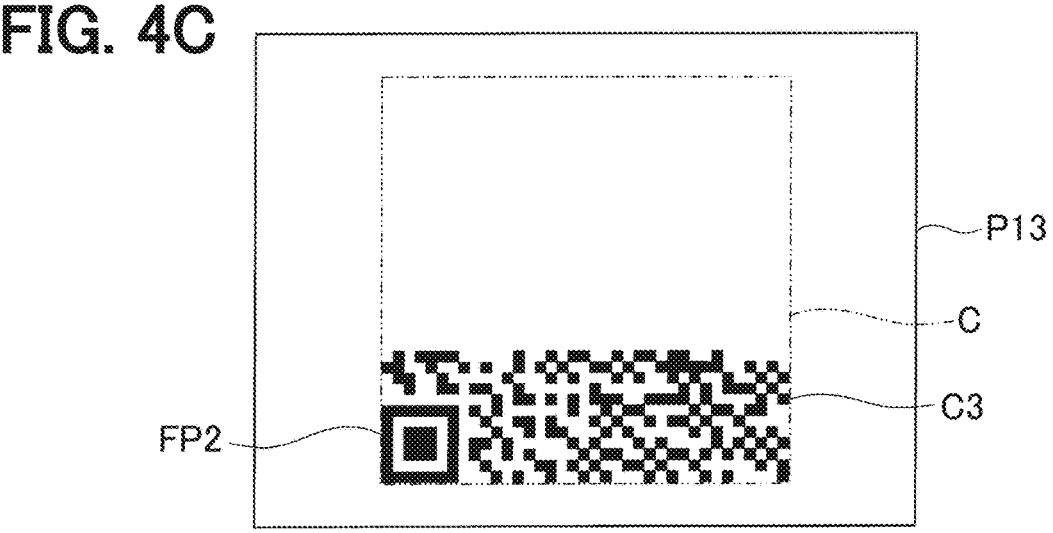
FIG. 4C is a diagram showing another partial code image including another partial code.

As shown in FIG. 4A to FIG. 4C, the partial code images P11 to P13 are generated so that a position of the code area of the QR code C matches with each partial code image. As shown in FIG. 4A, the partial code image P11 is generated so that the partial code C1 is arranged at a position corresponding to a position of the partial code relative to the information code to be displayed in a case where the information code to be displayed is arranged at a reference position (for example, a center of the screen). As shown in FIG. 4B, the partial code image P12 is generated so that the partial code C2 is arranged at a position corresponding to a position of the partial code C2 relative to the information code to be displayed in a case where the information code to be displayed is arranged at the reference position. As shown in FIG. 4C, the partial code image P13 is generated so that the partial code C3 is arranged at a position corresponding to a position of the partial code C3 relative to the information code to be displayed in a case where the information code to be displayed is arranged at the reference position. Each partial code image generated in this manner is stored in a predetermined image data storage area of the RAM 22a. The control unit 21 and the drawing frame generation module 23 correspond to an example of a partial code image generation unit.

The display module 24 is provided by, for example, a liquid crystal display, and includes a display screen 24a. The display controller 25 controls, according to an instruction from the control unit 21, a display content to be displayed on the display module 24. The display module 24 and the display controller 25 correspond to an example of a display unit.

As shown in FIG. 2, the information code display device 20 includes: an external communication unit (input output interface) 26 including an operation unit to which an operation is performed to input certain information and an interface for communicating with an external device; and a power supply unit that supplies power to the control unit 21 and other electrical components.

The following will describe a display process executed by the control unit 21 of the information code display device 20.

In the present embodiment, when the display process is executed by the control unit 21, the drawing frame generation module 23 generates multiple different partial code images in each of which one or more cells are removed from the information code to be displayed. According to a control by the display controller 25, the display module 24 cyclically displays each partial code image generated as described above on the display screen 24a at a predetermined display interval. For example, the cyclic display indicates a state in which multiple images are periodically displayed at the predetermined display interval.

Specifically, when the partial code images P11 to P13 are generated as described above, a display state in which only the partial code image P11 is displayed on the display screen 24a (see FIG. 4A), a display state in which only the partial code image P12 is displayed on the display screen 24a (see FIG. 4B), and a display state in which only the partial code image P13 is displayed on the display screen 24a (see FIG. 4C) are repeated in the described order at the predetermined display interval.

In the present embodiment, the predetermined display interval may be set to a time interval that causes an afterimage phenomenon, for example, about 20 milliseconds to 30 milliseconds. For example, when the three partial code images P11 to P13 are displayed at a display interval of about 20 milliseconds, a cycle of the cyclic display becomes about 60 milliseconds. As described above, each of the partial codes C1, C2, C3 is displayed at a position corresponding to a position of the partial code image P11, P12, P13 relative to the information code to be displayed. Thus, when a person sees the display screen 24a on which the partial code images P11 to P13 are cyclically (periodically) displayed, the QR code C can be visually recognized as a single information code by the afterimage phenomenon. When the display screen 24a on which the partial code images P11 to P13 are cyclically displayed is photographed, one of the partial code images P11 to P13 is captured as an image.

In the above display process, the information code to be displayed (QR code C) may be displayed on the display screen 24a for a predetermined time period according to a predetermined operation.

Figure 5:
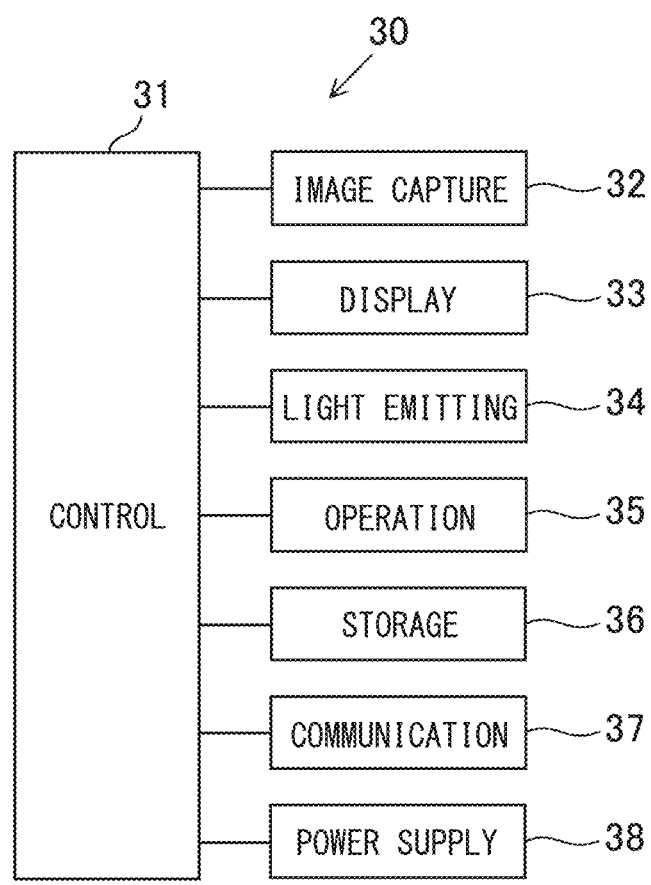
FIG. 5 is a block diagram schematically showing an electrical configuration of an information code reading device shown in FIG. 1.

The information code reading device 30 will be described with reference to FIG. 5.

The information code reading device 30 according to the present embodiment optically reads the information code, and is installed in a store or the like that provides a predetermined service using the information code. As shown in FIG. 5, the information code reading device 30 includes: a control unit 31 including a CPU; an image capturing unit 32; a display unit 33 including a liquid crystal display; a light emitting unit 34 including an LED or the like; an operation unit 35 including various operation keys (not shown); a storage unit 36 including ROM, RAM, non-volatile memory, etc.; a communication unit 37 including a communication interface for performing, with an external device such as a host terminal, a wired communication or a wireless communication; a power supply unit 38 supplying electric power to the control unit 31 and other electric components.

The image capturing unit 32 may be provided by a camera including an area sensor in which solid-state imaging elements such as C-MOS or CCD are arranged in two dimensions. An exposure time of the image capturing unit 32 is controlled by the control unit 31. The image capturing unit 32 acquires image data by converting an optical image of a subject, such as information code of an image formed on an image capturing surface, to an electronic signal.

As shown in FIG. 1, a substantially rectangular reading port 39a over which the information code or the like is scanned is provided on an upper surface of a case 39 of the information code reading device 30. The case 39 provides an outer shell of the information code reading device 30. The image capturing unit 32 is positioned in the case 39 so that light reflected on the information code, which is scanned over the reading port 39a, can be received thereby capturing an image of the information code.

In the storage unit 36 of the information code reading device 30, an application program related to the reading process is stored in advance in executable manner by the control unit 31. By executing the application program with the control unit 31, a predetermined process can be executed using the predetermined information recorded in the information code that is read by the information code reading device in optical manner. A detailed description of the reading process will be described later.

Figure 6:
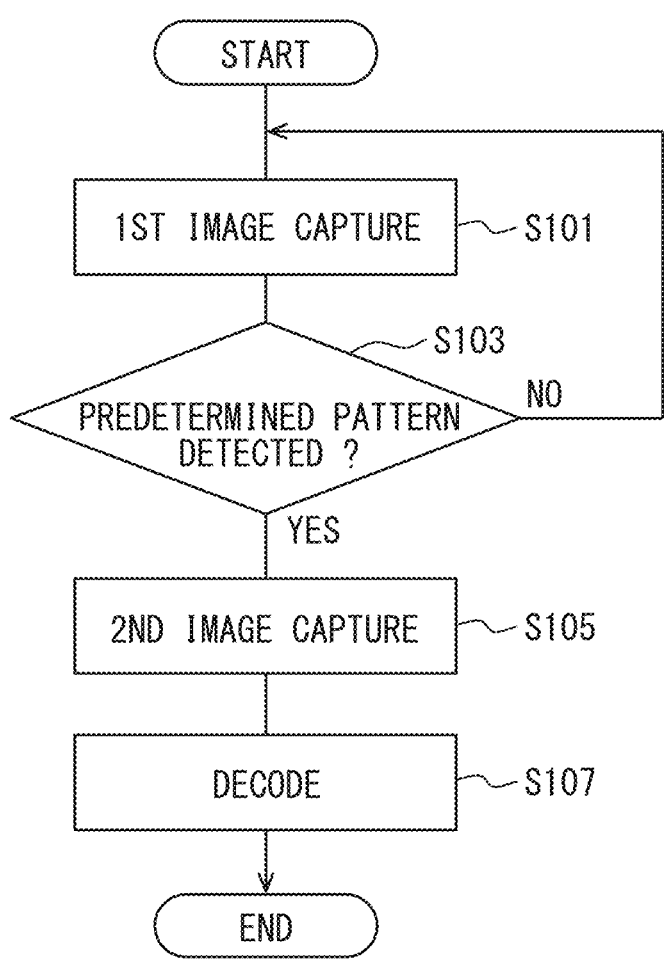
FIG. 6 is a flowchart showing a flow of a reading process executed by the information code reading device according to the first embodiment.

The following will describe the reading process executed by the control unit 31 of the information code reading device 30 with reference to the flow shown in FIG. 6. The reading process is executed for reading one information code by capturing each of the partial code images displayed on the information code display device 20. The partial code images P11 to P13 generated as described above are cyclically displayed on the display screen 24a of the information code display device 20.

When the control unit 31 starts the reading process in response to a predetermined operation made on the operation unit 35, the control unit 31 executes a first image capturing process shown in S101 of FIG. 6. In this process, the image capturing unit 32 captures an image of the information code or the like scanned over the reading port 39a with a normal exposure time. For example, an image capturing frequency of the normal exposure time may be set to 10 times/s. In a determination process of S103, the control unit 31 determines whether a specific pattern included in the information code is detected from the captured image. In the present embodiment, the QR code finder pattern (position detection pattern) is adopted as the specific pattern. When the control unit 31 determines that no finder pattern is detected, that is, determines NO in S103, the process returns to S101 and repeated.

In the first image capturing process, in response to the display screen 24a of the information code display device 20 being scanned over the reading port 39a by the user, at least one of the finder patterns FP1, FP2, FP3 is detected from the captured partial code image P11 or from the captured partial code image P13, the control unit determines YES in S103.

When determining YES in S103, the control unit executes a second image capturing process in S105. In the second image capturing process, the exposure time is set to be longer than that of the first image capturing process, and the information code or the like scanned over the reading port 39a is captured by the image capturing unit 32. In the present embodiment, the exposure time in the second image capturing process is set to a time sufficiently longer than an integral multiple of the cycle (60 milliseconds) of the cyclic display. For example, the image capturing frequency of the exposure time in the second image capturing process may be set to 1 time/s.

Figure 7:
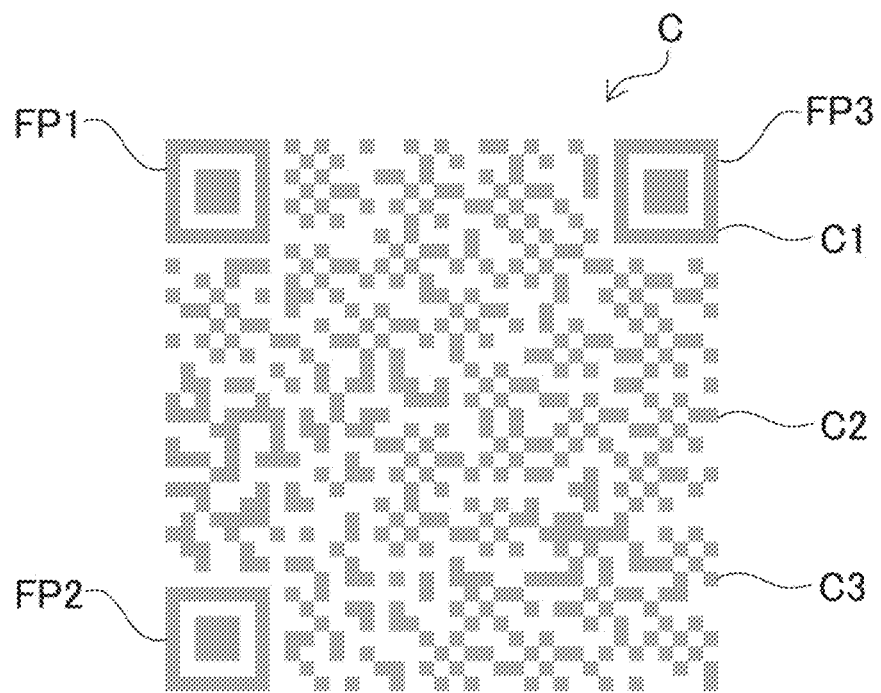
FIG. 7 is a diagram showing a captured image of a display screen in which different partial code image are cyclically captured.

When the display screen 24a on which the partial code images P11 to P13 are cyclically displayed is captured by the image capturing unit 32 with the long exposure time, as shown in FIG. 7, the partial code images P11, P12, P13 are photographed in overlapped manner. Thus, the QR code is photographed such that the partial code C1, C2, C3 are connected together. A dark color cell of the QR code C obtained by the second image capturing process is generated by superimposing light color portions of two partial code images on a dark color cell of remaining one partial code image. Thus, a brightness of the dark color cell of the QR code C obtained by the second image capturing process is higher than a brightness of the dark color cell of the QR code C obtained by a normal image capturing with normal exposure time (close to a brightness of a light color cell). Since the number of partial code images is small, that is, three, the QR code C can be photographed in a state where a contrast between the dark color cell and the light color cell can be decoded. For example, the light color cell may be a white cell, and the dark color cell may be a black cell. Alternatively, a cell having a brightness range within 0 to 85 relative to 256 gradations may correspond to the dark color cell, and a cell having a brightness range within 170 to 256 relative to 256 gradations may correspond to the light color cell.

When the image is taken with the long exposure time as described above, a decoding process is executed in S107 to decode the information code captured by the second image capturing process. When the QR code C is photographed as shown in FIG. 7 described above, character data or the like recorded in the QR code C is decoded and read. The control unit 31 that executes the process shown in S107 may correspond to a decoding unit.

As described above, in the information code reading system 10 according to the present embodiment, the drawing frame generation module 23 of the information code display device 20 generates multiple partial code images to be different from one another. Specifically, each partial code image (P1, P2, P3) is generated by removing partial cells from the information code to be displayed, and the partial cells removed from the information code to be displayed is set to be different from one another. Each cell is included at least one of the partial code images, and all of the cells configure a code area of the information code to be displayed. The display module 24 displays the multiple partial code images on the display screen 24a with the code area as a reference in cyclic manner. In the information code reading device 30, the image capturing unit 32 captures an image of the display screen 24a with the exposure time longer than the cycle of the cyclic display. Then, the control unit 31 decodes and read the information code, in the decoding process, from the image captured by the image capturing unit 32.

When the display screen 24a of the information code display device 20 is simply photographed with normal exposure time, only one partial code image is captured and the whole information code to be displayed is not captured. In the above configuration, the information code reading device 30 photographs the display screen 24a with an exposure time longer than the cycle of the cyclic display. Thus, an image in which entire partial code images overlap with one another can be obtained. Since the information code to be displayed is formed in the code area of the captured images, the information code can be read regardless of the cyclic display speed. Therefore, duplication of the information code displayed on the screen can be prevented.

In the present embodiment, the drawing frame generation module 23 divides the information code to be displayed into three equal parts, that is, partial codes C1 to C3. Alternatively, the information code to be displayed may be divided into two equal parts, four equal parts, or more than four equal parts to generate the partial codes.

Second Embodiment

The information code reading system according to a second embodiment will be described with reference to the drawings.

The second embodiment is different from the first embodiment mainly in generation of the partial codes. In the present embodiment, the partial codes are generated to overlap with one another. Therefore, components that are substantially the same as those in the first embodiment will be denoted by the same reference symbols, and a description thereof will be omitted.

In the first embodiment, multiple partial code images different from one another are generated by dividing the information code to be displayed into multiple cells so that the multiple cells are not overlapped with one another. Then, the generated partial code images are displayed in the cyclic manner. When the partial code images are photographed by the second image capturing process with long exposure time, an increase in the number (quantity of divided images) of partial code images causes an increase of brightness of the dark color cell (the brightness of dark color cell becomes close to the brightness of light color cell). Thus, when the number of partial code images (quantity of divided images) increases to an extremely large quantity, the contrast between the dark color cells and the light color cells decreases, thereby causing a failure in reading.

In the present embodiment, the partial code images are generated so that a certain cell corresponding to a predetermined range of the information code to be displayed is included in two or more partial code images. With this configuration, even if the partial code images are captured with a long exposure time, the brightness of dark color cell at least in the predetermined range is less likely to increase, and the decrease in contrast can be suppressed.

Figure 8A:
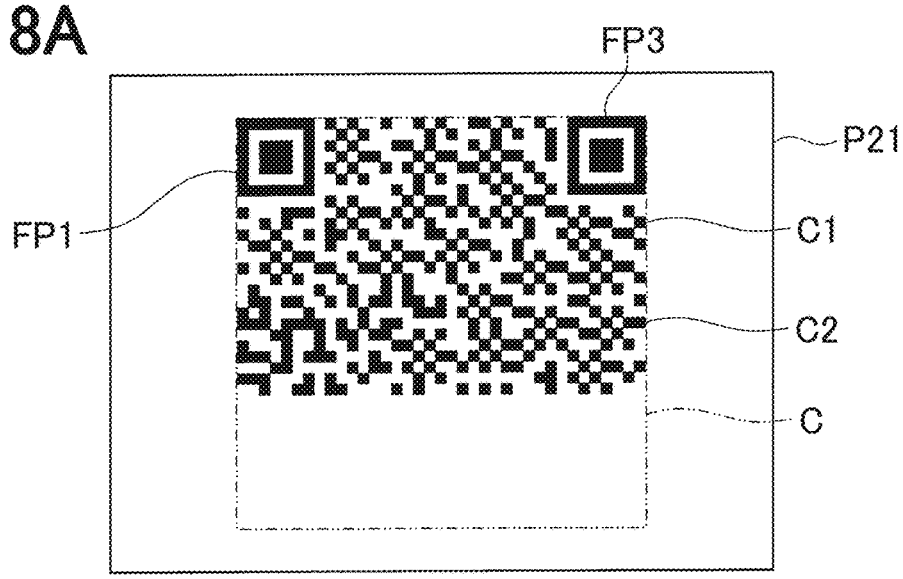
FIG. 8A is a diagram showing a partial code image including a partial code according to a second embodiment.
Figure 8B:
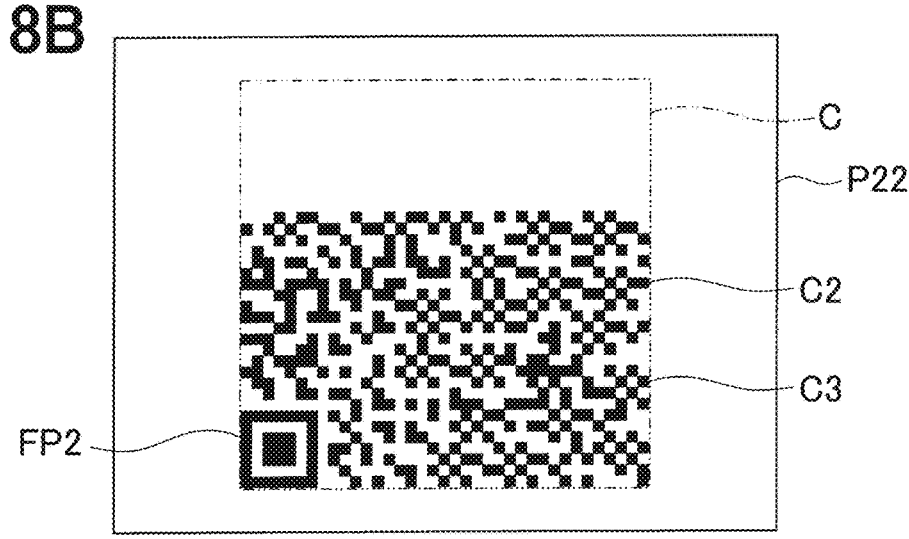
FIG. 8B is a diagram showing another partial code image including another partial code.
Figure 8C:
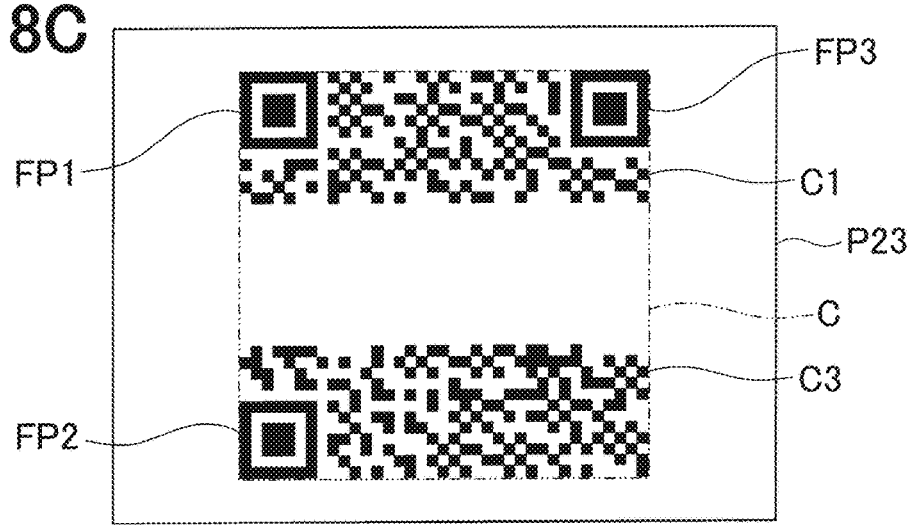
FIG. 8C is a diagram showing another partial code image including another partial code.
Figure 9:
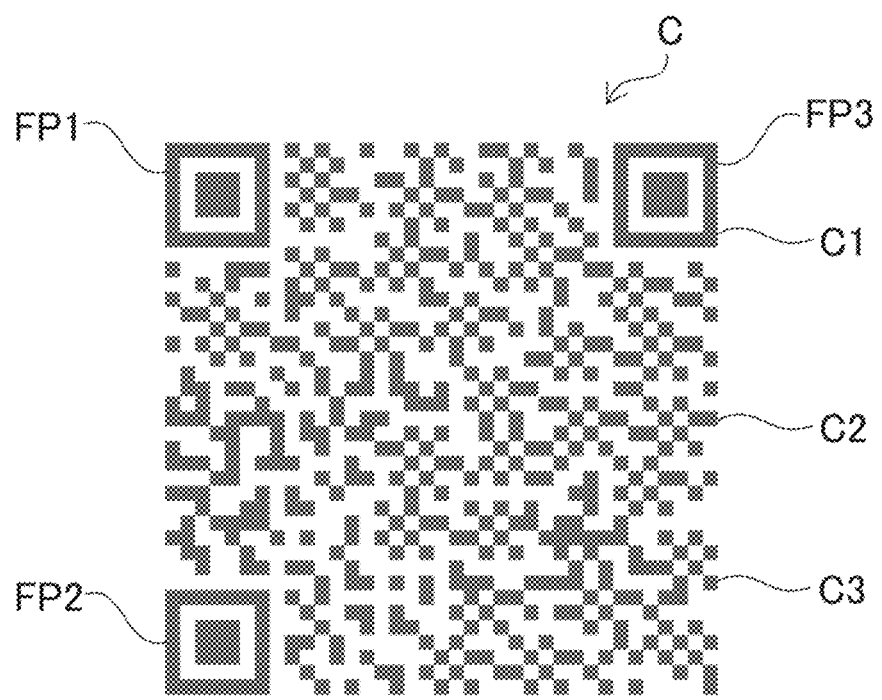
FIG. 9 is a diagram showing a captured image of a display screen in which different partial code image are cyclically captured.

For example, partial code images may be generated so that a partial code image P21 (see FIG. 8A) includes a partial code C1 and a partial code C2, a partial code image P22 includes a partial code C2 and a partial code C3 (See FIG. 8B), and a partial code image P23 (see FIG. 8C) includes a partial code C3 and a partial code C1. In this configuration, when the image capturing unit 32 captures an image of the display screen 24a on which the partial code images P21 to P23 are cyclically displayed with long exposure time in the second image capturing process, the QR code shown in FIG. 9 is captured.

As described above, in a state where the partial code images P21 to P23 are cyclically displayed, the partial code images are photographed such that the partial code C1 of the partial code image P21 is overlapped with the partial code C1 of the partial code image P23, the partial code C2 of the partial code image P21 is overlapped with the partial code C2 of the partial code image P22, and the partial code C3 of the partial code image P22 is overlapped with the partial code C3 of the partial code image P23. Therefore, the brightness (see FIG. 9) of the dark color cell of the QR code C obtained by capturing the display screen 24a on which the partial code images P21 to P23 are cyclically displayed can be decreased to a lower level of the brightness (see FIG. 7) of the dark color cell of the QR code C obtained by image the display screen 24a on which the partial code images P11 to P13 are cyclically displayed.

As described above, in the information code reading system 10 according to the present embodiment, the partial code images are generated so that a certain cell corresponding to a predetermined range of the information code to be displayed is included in two or more partial code images. With this configuration, even if the partial code images are captured with a long exposure time, the brightness of dark color cell at least in the predetermined range is less likely to increase. As a result, it is possible to suppress reading failure due to a decrease in contrast between the dark color cells and the light colored cells.

In the present embodiment, three images cyclically displayed on the display screen 24a are generated as the partial code images P21 to P23. Alternatively, two, four or more images may be generated as the partial code images so that each cell included in one partial code image is overlapped with at least one cell included in another partial code image.

Third Embodiment

The information code reading system according to a third embodiment will be described with reference to the drawings.

The third embodiment is different from the second embodiment mainly in that an authentication is performed by using a predetermined range in which two partial cods overlap one another. Therefore, components that are substantially the same as those in the second embodiment will be denoted by the same reference symbols, and a description thereof will be omitted.

In the second embodiment, the partial code images P21 to P23 are generated so that each cell included in one partial code overlaps with one of the cells included in another partial code. Thus, as shown in FIG. 9, in the QR code C captured by the information code reading device 30, each dark color cell has substantially the same brightness.

In the present embodiment, the partial code is generated to include a range in which the cells overlap and a range in which the cells do not overlap relative to another partial code. That is, multiple different partial code images are generated so that only a cell corresponding to a predetermined range of the information code to be displayed is included in two or more partial code images.

Figure 10A:
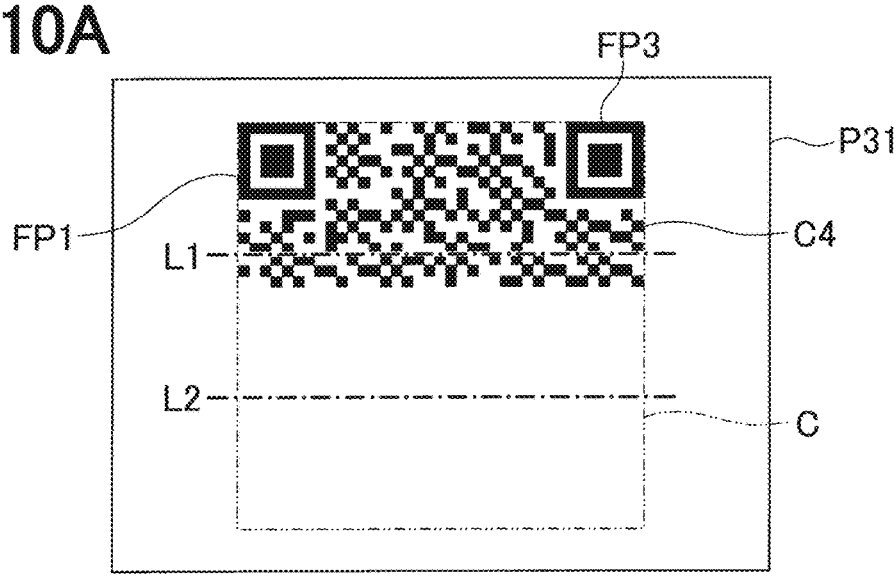
FIG. 10A is a diagram showing a partial code image including a partial code according to a third embodiment.
Figure 10B:
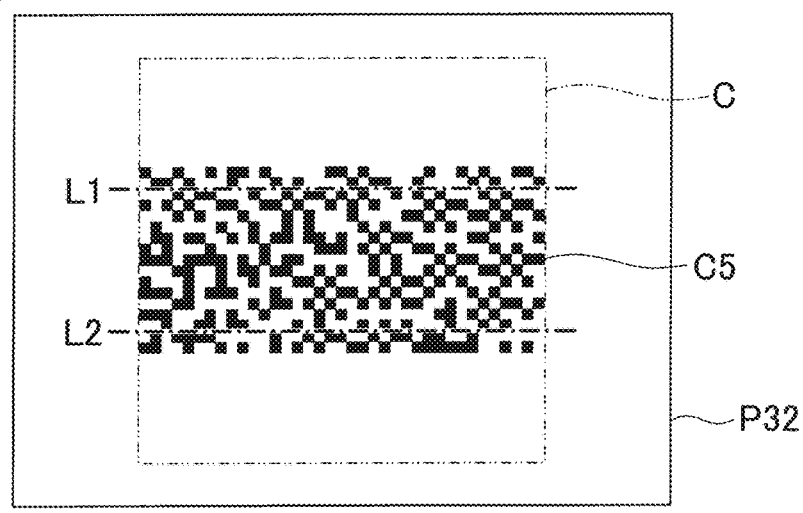
FIG. 10B is a diagram showing another partial code image including another partial code.
Figure 10C:
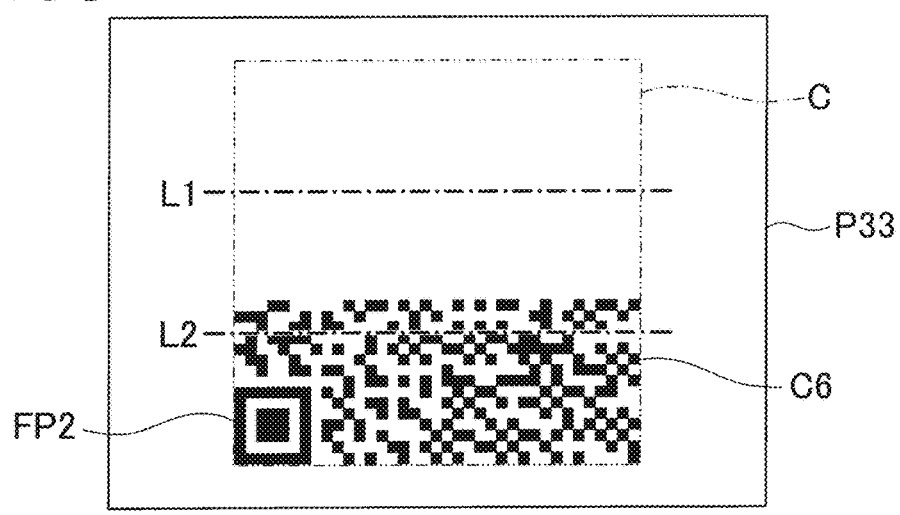
FIG. 10C is a diagram showing another partial code image including another partial code.

For example, as shown in FIG. 10A, a partial code C4 is generated to exceed the trisection line L1 with respect to the partial code C1. As shown in FIG. 10B, a partial code C5 is generated to exceed both of the trisection line L1 and the trisection line L2 with respect to the partial code C2. As shown in FIG. 10C, a partial code C6 is generated to exceed the trisection line L2 with respect to the partial code C3. Correspondingly, a partial code image P31 including the partial code C4, a partial code image P32 including the partial code C5, and a partial code image P33 including the partial code C6 are generated.

Figure 11:
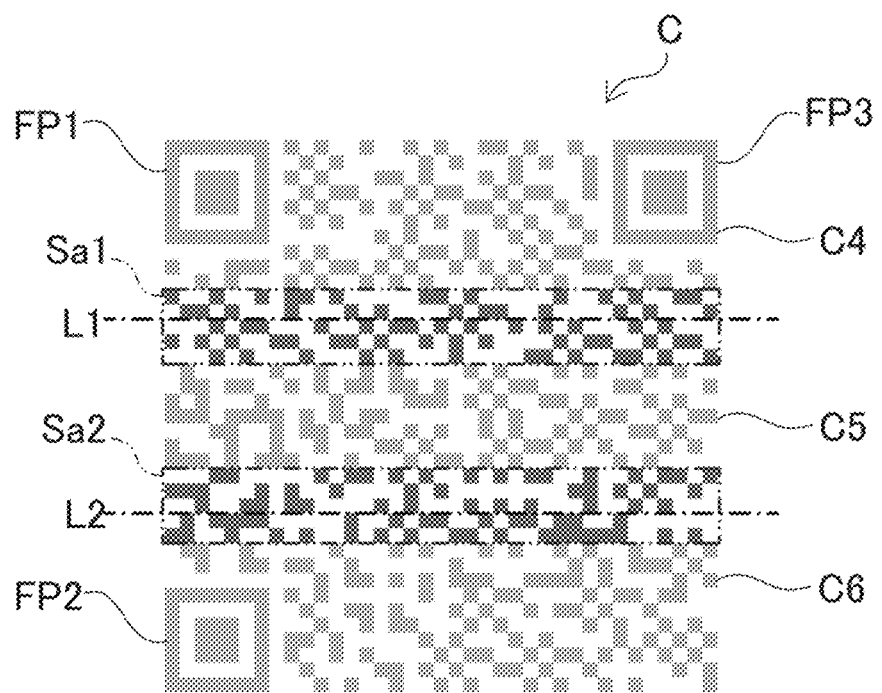
FIG. 11 is a diagram showing a captured image of a display screen in which different partial code image shown in FIG. 10A to FIG. 10C are cyclically captured.

In this configuration, when the image capturing unit 32 captures an image of the display screen 24a on which the partial code images P31 to P33 are cyclically displayed with long exposure time in the second image capturing process, the QR code shown in FIG. 11 is captured.

As can be seen from FIG. 11, the partial code images are photographed such that the partial code C4 of the partial code image P31 is overlapped with the partial code C5 of the partial code image P32 in the vicinity of the trisection line L1 (hereinafter, also referred to as a first overlapping range Sa1). That is, a cell corresponding to the first overlapping range Sa1 in the QR code C is included in both of the partial code image P31 and the partial code image P32. The partial code images are photographed such that the partial code C5 of the partial code image P32 is overlapped with the partial code C6 of the partial code image P33 in the vicinity of the trisection line L2 (hereinafter, also referred to as a second overlapping range Sa2). That is, a cell corresponding to the second overlapping range Sa1 in the QR code C is included in both of the partial code image P32 and the partial code image P33. Therefore, the brightness of the dark color cells in the first overlapping range Sa1 and the brightness of the dark color cells in the second overlapping range Sa2 are lower than the brightness of the dark color cells in a range other than the first and the second overlapping ranges Sa1, Sa2. The first overlapping range Sa1 and the second overlapping range Sa2 may correspond to a predetermined range.

In the present embodiment, the authentication determination is performed using the cell included in the first overlapping range Sa1 and the cell included in the second overlapping range Sa2. In the image obtained by capturing the display screen 24a on which the partial code images P31 to P33 are cyclically displayed with a long exposure time, the brightness of the dark color cells in the first overlapping range Sa1 and the second overlapping range Sa2 is different from the brightness of dark color cells in the remaining range by a predetermined level. In the image obtained by capturing a counterfeit code with a long exposure time, a predetermined difference is not generated between the brightness of the dark color cells in the first overlapping range Sa1 and the second overlapping range Sa2 and the brightness of dark color cells in the remaining range. Herein, the counterfeit code may be generated by illegally acquiring information recorded in the genuine QR code. Therefore, when the predetermined difference is determined between the brightness of the dark color cells in the first and second overlapping range Sa1, Sa2 and the brightness of the dark color cells in the remaining range, the information code is determined to be the genuine code. When the predetermined difference cannot be determined between the brightness of the dark color cells in the first and second overlapping range Sa1, Sa2 and the brightness of the dark color cells in the remaining range, the information code is determined to be the counterfeit code (information code that may have been forged).

Figure 12:
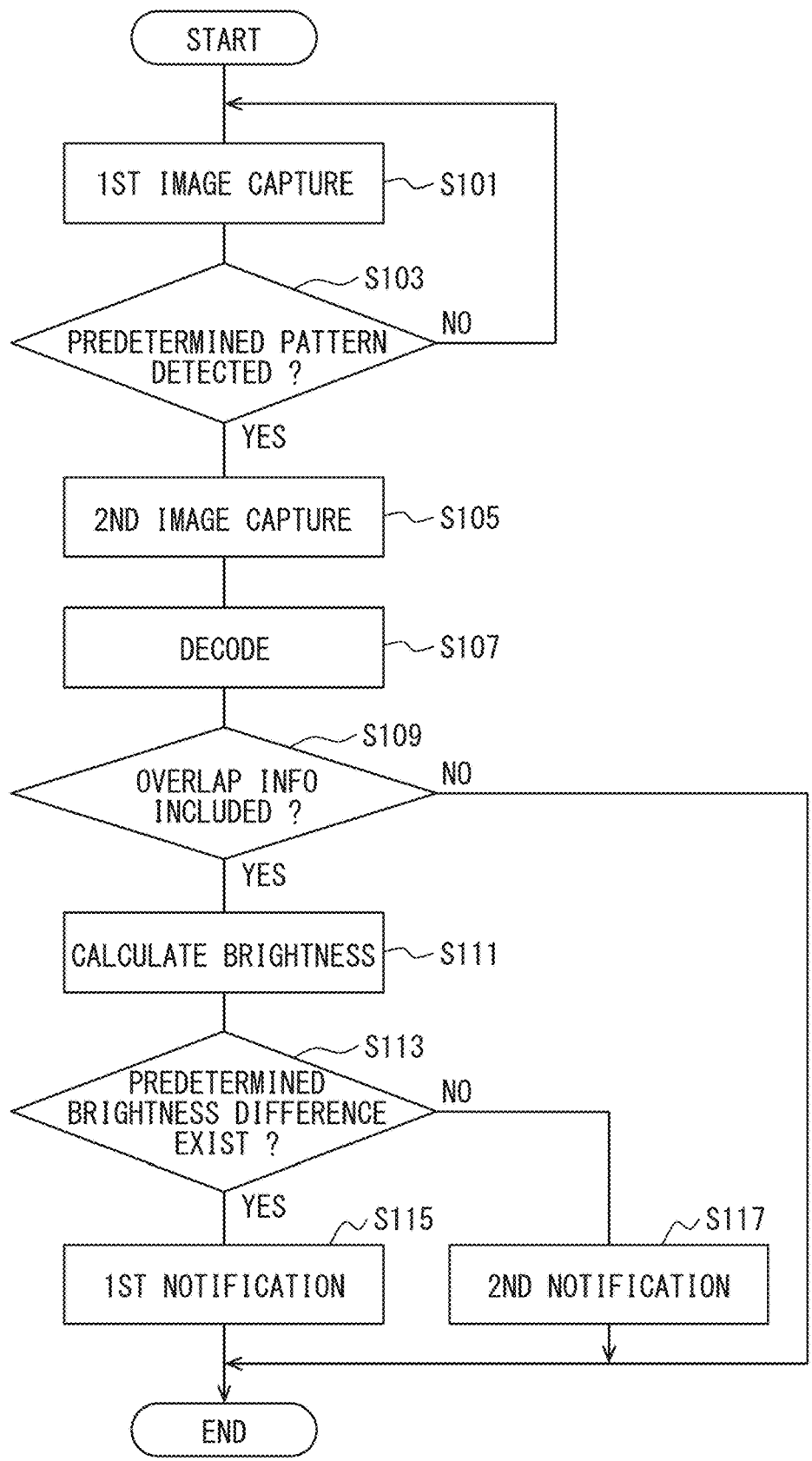
FIG. 12 is a flowchart showing a flow of a reading process executed by the information code reading device according to a third embodiment.

The following will describe the reading process including an authentication determination according to the present embodiment with reference to the flowchart shown in FIG. 12. In the present embodiment, information such as the position and brightness (predetermined brightness difference) of the cells of the first overlapping range Sa1 and the second overlapping range Sa2 (hereinafter, also simply referred to as overlapping information) is recorded in the QR code C in encrypted manner. For example, as the predetermined brightness difference, the brightness of the dark color cells in the first overlapping range Sa1 and the second overlapping range Sa2 may be set within a range of 150 to 255 relative to 256 gradations of gray scale, and the brightness of the dark color cells in the remaining range of the code area may be set within a range of 70 to 90 relative to 256 gradations of gray scale.

As shown in FIG. 12, similar to the first embodiment, when at least one of the finder patterns FP1 to FP3 is detected in the first image capturing process of S101 (YES in S103), the second image capturing process is started (S105). When the image is taken with the long exposure time as described above, the decoding process is executed in S107 to decode the information code captured by the second image capturing process. When the information code does not include the overlap information (NO in S109), authentication of the information code is not performed, and a subsequent process is executed using the character data or the like obtained by decoding the information code.

Based on the decoding result (reading result), when determining that the information code includes the overlap information (YES in S109), the process executes the brightness calculation shown in S111. In this process, the brightness of the cell of the first overlapping range Sa1 including the dark color cells and the brightness of the cell of the second overlapping range Sa2 including the dark color cells are calculated. The first and second overlapping ranges Sa1, Sa2 are specified based on the overlapping information read in S107. The control unit 31 that acquires the overlap information from the decoding result (reading result) of the decoding process corresponds to an acquisition unit. The control unit 31 that performs the brightness calculation process corresponds to a brightness calculation unit.

In a determination process shown in S113, the control unit determines whether a predetermined difference exists between the brightness of the dark color cells in the predetermined range, that is, the first overlapping range Sa1 and the second overlapping range Sa2 and the brightness of dark color cells in the remaining range of the code area. The control unit 31 that performs the determination process of S113 corresponds to an authentication unit.

As described above, the display screen 24a on which the partial code images P31 to P33 are cyclically displayed is captured in the second image capturing process. Thus, when the QR code C is captured in the second image capturing process, as shown in FIG. 11, a predetermined difference exists between the brightness of the dark color cells in the predetermined range, that is, the first overlapping range Sa1 and the second overlapping range Sa2 and the brightness of the dark color cells in the remaining range of the code area. Thus, the control process determines YES in S113. For example, suppose that the brightness of dark cells in the first overlapping range Sa1 and the second overlapping range Sa2 is calculated to be 200 relative to 256 gradations of gray scale, and the brightness of dark cells in the remaining range of the code area is calculated to be 80 relative to 256 gradations of gray scale. In this case, the above-mentioned predetermined brightness difference is generated, and the process determines YES in S113. In this case, a first notification process shown in S115 is performed, and a notification is made to notify that a genuine information code is read using a display on the display unit 33, a light emission by the light emitting unit 34, or the like. In this manner, the process using decoding result is performed.

When a counterfeit code is captured in the second image capturing process, a predetermined difference does not exist between the brightness of the dark color cells in the first overlapping range Sa1 and the second overlapping range Sa2 and the brightness of the dark color cells in the remaining range of the code area. Thus, the control process determines NO in S113. For example, suppose that the brightness of dark cells in the first overlapping range Sa1 and the second overlapping range Sa2 is calculated to be 80 relative to 256 gradations of gray scale, and the brightness of dark cells in the remaining range of the code area is also calculated to be 80 relative to 256 gradations of gray scale. In this case, the above-mentioned predetermined brightness difference is not generated, and the process determines NO in S113. In this case, a second notification process shown in S117 is performed, and a notification is made to notify that a counterfeit information code that may have been forged is read using a display on the display unit 33, a light emission by the light emitting unit 34, or the like.

As described above, in the information code reading system 10 according to the present embodiment, the information code reading device 30 calculates the brightness of the information code captured by the image capturing unit 32 for each cell (S111), and the above-mentioned overlap information (information about cells included in the predetermined range) is acquired from the decoding result of the decoding process. Then, based on the calculated brightness and the acquired information of the cells included in the predetermined range, the authenticity of the information code captured by the image capturing unit 32 is determined.

With this configuration, not only the duplication of the information code displayed on the screen can be prevented, but also the authenticity of the information code captured by the image capturing unit 32 can be determined.

The overlap information (information of cells included in the predetermined range) is encrypted and recorded in the information code to be read, and the overlap information is acquired from the decoding result obtained by the decoding process. This configuration eliminates a process to acquire the overlap information in advance, and also makes it possible to change the predetermined range for each information code to be displayed. Thus, the present embodiment makes it more difficult to forge the information code and improves an authentication accuracy.

Figure 13:
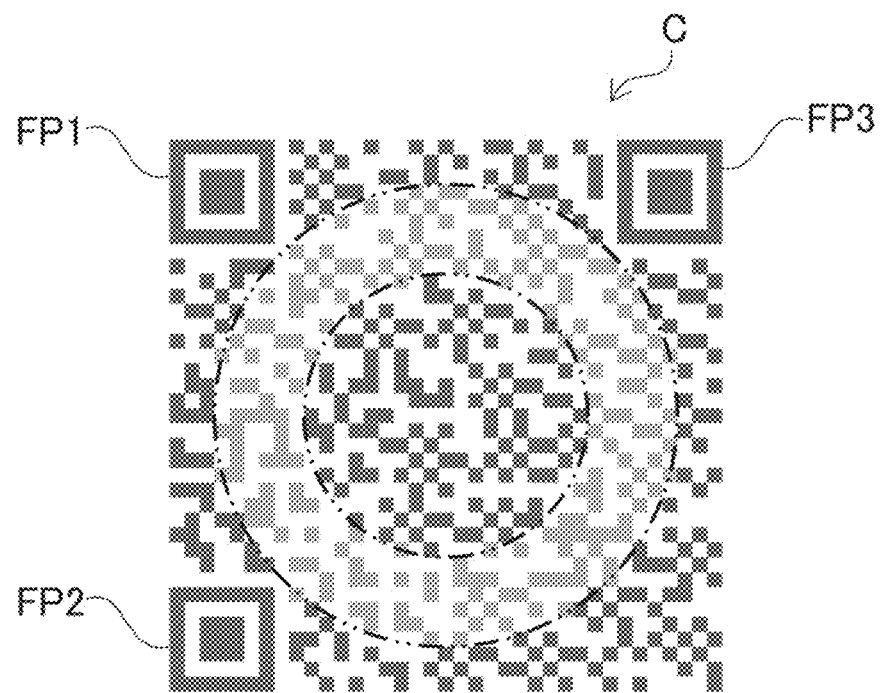
FIG. 13 is a diagram showing a captured image of a display screen in which different partial code image are cyclically captured according to a first modification of the third embodiment.
Figure 14:
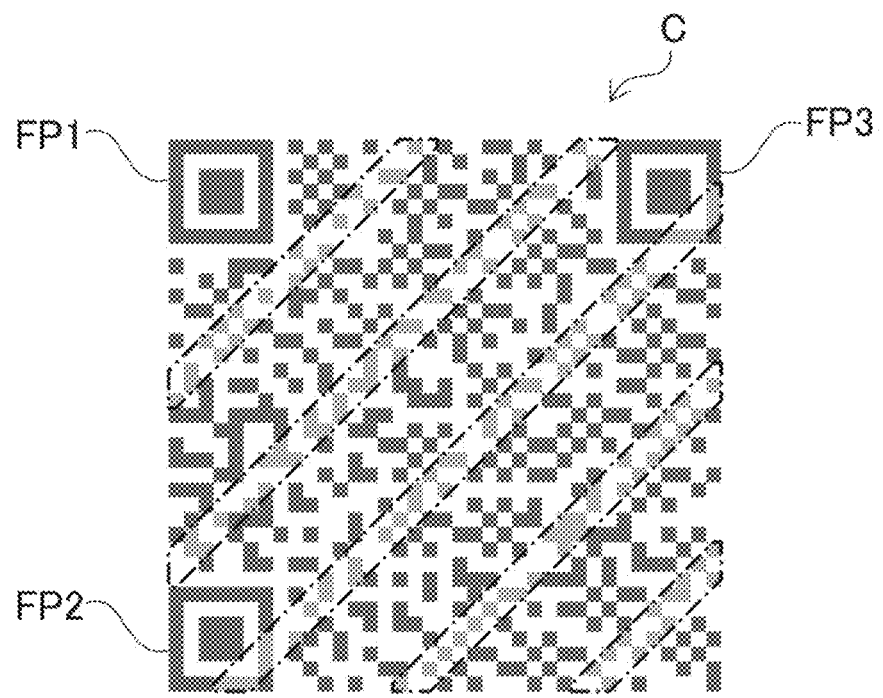
FIG. 14 is a diagram showing a captured image of a display screen in which different partial code image are cyclically captured according to a second modification of the third embodiment.

It should be noted that the multiple partial code images cyclically displayed on the display screen 24a are not limited to the above-mentioned partial code images P31 to P33. Alternatively, when photographed with a long exposure time, under a condition that a predetermined brightness difference is generated in a different predetermined range, the partial code images can be properly generated in different manner. For example, as in a first modification shown in FIG. 13, the partial code images may be generated so that a predetermined brightness difference is generated between the dark color cells in an annular range centered on the code area and the dark color cells in the remaining range of the code area. For another example, as in a second modification shown in FIG. 14, the partial code images may be generated so that a predetermined brightness difference is generated between the dark color cells in multiple diagonal band ranges and the dark color cells in the remaining range of the code area.

As described above, the overlap information (position information or brightness information of the cells included in the first overlap range Sa1 and the second overlap range Sa2) is encrypted and recorded in the QR code C. Alternatively, the overlap information may be stored, in advance, in the storage unit 36 of the information code reading device 30. In this case, in the reading process, determination performed in S109 can be eliminated. Instead, in S113, the overlap information acquired from the storage unit 36 may be determined whether to have the predetermined difference between the brightness of the dark color cells in the first overlapping range Sa1 and the second overlapping range Sa2 and the brightness of the dark color cells in the remaining range of the code area.

Fourth Embodiment

The information code reading system according to a fourth embodiment will be described with reference to the drawings.

The fourth embodiment is different from the first embodiment mainly in that the information code display device cyclically displays similar code images instead of the partial code images. Therefore, components that are substantially the same as those in the first embodiment will be denoted by the same reference symbols, and a description thereof will be omitted.

In the present embodiment, instead of the partial codes described above, similar codes are generated. The control unit 21 of the information code display device 20 generates the similar codes to be cyclically displayed in the same code area of the information code to be displayed so that (i) a cell arrangement structure of each similar code is the same as a cell arrangement structure in the code area of the information code to be displayed, and (ii) the dark color cell having the first brightness and the light color cell having the second brightness are generated and arranged to differ the brightness of partial cells from one another. Each similar code is generated so that a cell size and a cell arrangement are the same as one another, and entire dark colored cells have the same brightness, that is, the first brightness, and entire light color cells have the same brightness, that is, the second brightness.

The control unit 21 generates similar code images as follows. Among the cells constituting each of multiple different similar codes, a cell corresponding to a position of a dark color cell of the information code to be displayed is defined as a dark color forming cell and a cell corresponding to a position of a light color cell of the information code to be displayed is defined as a light color forming cell. Specifically, the control unit 21 generates the similar code images in the following manner. With the code area as a reference, for the dark color forming cells of the similar codes located at the same position, a quantity of the dark color cells each of which has the first brightness is set to be greater than a quantity of the light color cells each of which has the second brightness. With the code area as a reference, for the light color forming cells of the similar codes located at the same position, a quantity of the light color cells each of which has the second brightness is set to be greater than a quantity of the dark color cells each of which has the first brightness. Herein, the quantity of dark or light color cells may be one or more than one. The control unit 21 generates the similar code images so that a portion corresponding to the dark color forming cells located at the same position relative to the code area can be determined as the dark color cell based on a predetermined threshold value related to dark light determination when the similar codes are cyclically displayed and captured. The control unit 21 generates the similar code images so that a portion corresponding to the light color forming cells located at the same position relative to the code area can be determined as the light color cell based on the predetermined threshold value related to dark light determination when the similar codes are cyclically displayed and captured. The control unit 21 that generates the similar code images corresponds to a similar code image generation unit.

Figure 15:
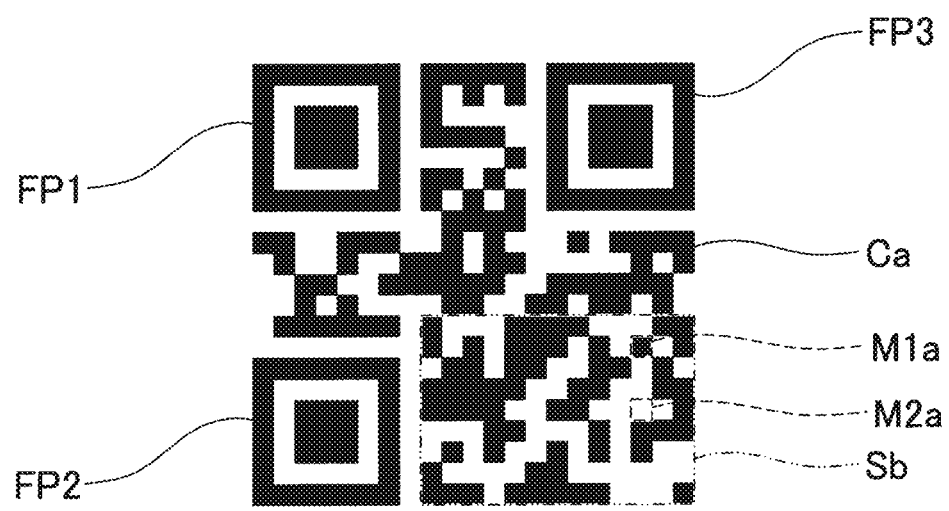
FIG. 15 is a diagram showing an information code to be displayed according to a fourth embodiment.
Figure 16A:
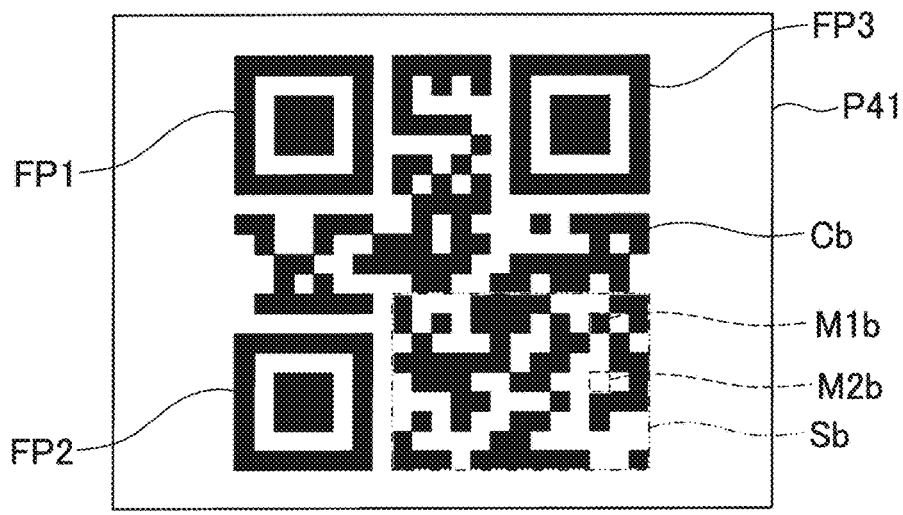
FIG. 16A is a diagram showing a similar code image including a similar code according to the fourth embodiment.
Figure 16B:
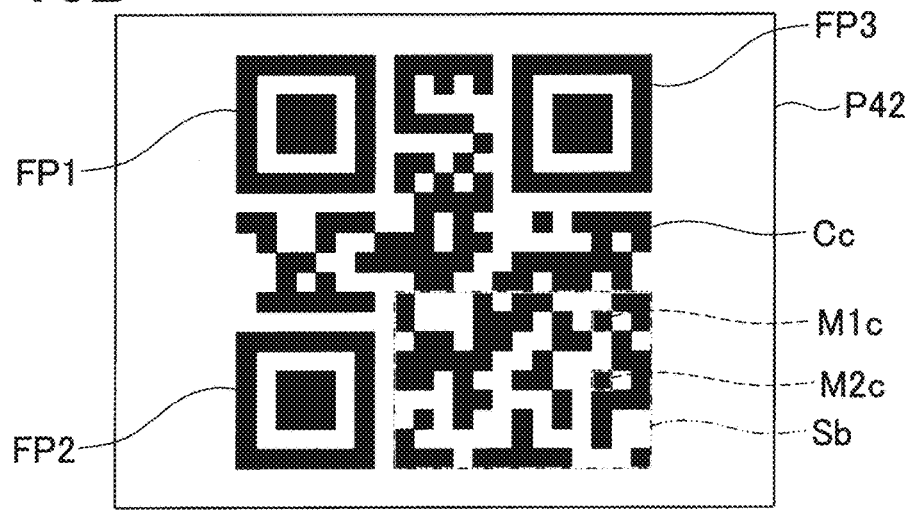
FIG. 16B is a diagram showing another similar code image including another similar code.
Figure 16C:
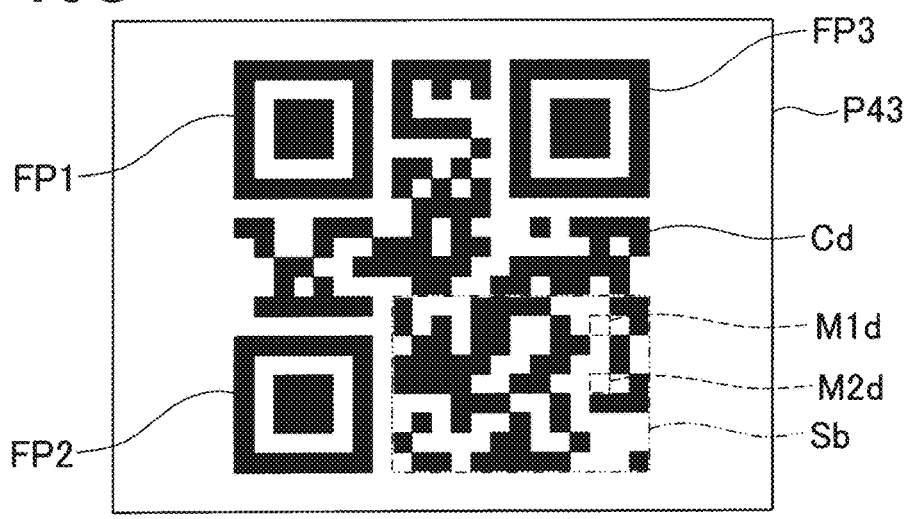
FIG. 16C is a diagram showing another similar code image including another similar code.

The following will describe generation of three different similar code images Cb, Cc, Cd corresponding to the QR code Ca to be displayed shown in FIG. 15 with reference to FIG. 16A, FIG. 16B, and FIG. 16C. In each of the similar code image, within a partial code area, all of the cells are set to be the same as the QR code Ca, and within the remaining code area (hereinafter also referred to as change area Sb), at least one cell is set to be different from the QR code Ca.

As shown in FIG. 16A, the similar code image P41 is generated corresponding to the similar code Cb. Specifically, in the change area Sb of similar code Cb, the dark color forming cell M1b corresponding to the dark color cell M1a of the QR code Ca shown in FIG. 15 is changed to the dark color cell having the first brightness. As shown in FIG. 16B, the similar code image P42 is generated corresponding to the similar code Cc. Specifically, in the change area Sb of similar code Cc, the dark color forming cell M1c corresponding to the dark color cell M1a is changed to the dark color cell having the first brightness. As shown in FIG. 16C, the similar code image P43 is generated corresponding to the similar code Cd. Specifically, in the change area Sb of similar code Cd, the dark color forming cell M1d corresponding to the dark color cell M1a is changed to the light color cell having the second brightness. Similarly, for other dark color cells included in the change area Sb of the QR code Ca, the similar codes Cb, Cc, Cd are generated so that the corresponding dark color forming cells are changed to the dark color cells having the first brightness in at least two similar codes.

For the dark color forming cells located at the same position relative to the code area, a quantity of the similar codes in which the dark color cells having the first brightness are generated is greater than a quantity of the similar codes in which the light color cells having the second brightness are generated. Specifically, for the above-described dark color cell M1a, among three dark color forming cells M1b, M1c, M1d, two dark color forming cells M1b and M1c are generated as the dark color cells having the first brightness and one dark color forming cell M1d is generated as the light color cell having the second brightness.

As shown in FIG. 16A, the similar code image P41 is generated corresponding to the similar code Cb. Specifically, in the change area Sb of similar code Cb, the light color forming cell M2b corresponding to the light color cell M2a of the QR code Ca shown in FIG. 15 is changed to the light color cell having the second brightness. As shown in FIG. 16B, the similar code image P42 is generated corresponding to the similar code Cc. Specifically, in the change area Sb of similar code Cc, the light color forming cell M2c corresponding to the light color cell M2a is changed to the dark color cell having the first brightness. As shown in FIG. 16B, the similar code image P43 is generated corresponding to the similar code Cd. Specifically, in the change area Sb of similar code Cd, the light color forming cell M2d corresponding to the light color cell M2a is changed to the light color cell having the second brightness. Similarly, for other light color cells included in the change area Sb of the QR code Ca, the similar codes Cb, Cc, Cd are generated so that the corresponding light color forming cells are changed to the light color cells having the second brightness in at least two similar codes.

For the light color forming cells located at the same position relative to the code area, a quantity of the similar codes in which the light color cells having the second brightness are generated is greater than a quantity of the similar codes in which the dark color cells having the first brightness are generated. Specifically, for the above-described light color cell M2a, among three light color forming cells M2b, M2c, M2d, two light color forming cells M2b and M2c are generated as the light color cells having the second brightness and one light color forming cell M2d is generated as the dark color cell having the first brightness.

Figure 17:
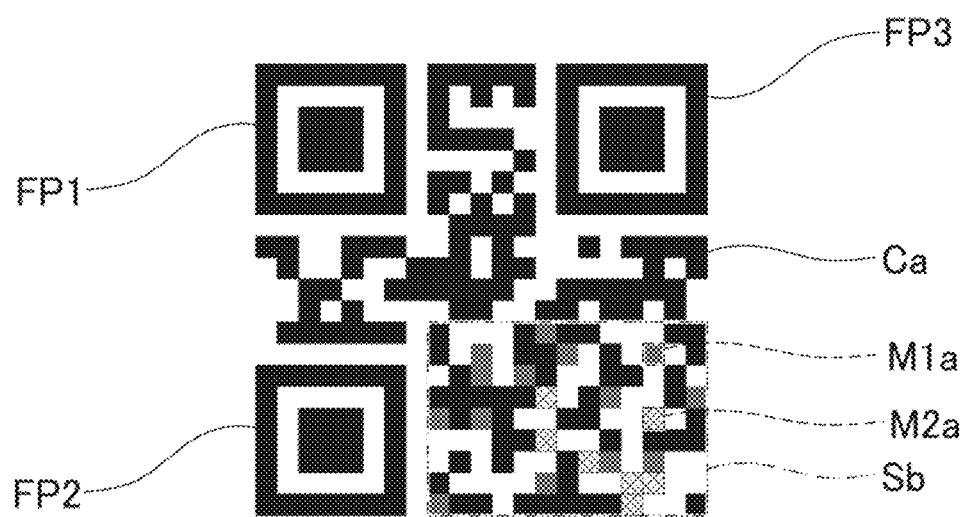
FIG. 17 is a diagram showing a captured image of a display screen in which different similar code image shown in FIG. 16A to FIG. 16C are cyclically captured.

The similar code images P41, P42, P43 generated as described above are cyclically displayed on the display screen 24a, and the display screen 24a is captured by the image capturing unit 32 with an exposure time longer than the cycle of the cyclic display (S105). Thus, the similar code images P41 to P43 are captured such that images overlap with one another, thereby obtaining the captured image of the QR code Ca as shown in FIG. 17. In FIG. 17, each cell in which two dark color cells having the first brightness overlap with one light color cell having the second brightness is shown with gray color, and each cell in which one dark color cell having the first brightness overlap with two light color cells having the second brightness is shown by cross hatching.

FIG. 17 shows the captured image of the QR code Ca. As shown in FIG. 17, in the change area Sb of the QR code Ca, the brightness of the dark color cell, such as the dark color cell M1a in which multiple dark color forming cells are overlapped is relatively high, and is close to the first brightness. The brightness of the light color cell, such as the light color cell M2a in which multiple light color forming cells are overlapped is close to the second brightness. The predetermined threshold value related to dark light determination is set to be between the brightness of the cell formed by overlapping captured images of multiple dark color forming cells and the brightness of the cell formed by overlapping captured images of multiple light color forming cells. As a result, in the decoding process of S107, the photographed QR code Ca as shown in FIG. 17 can be recognized as the QR code Ca in which light cells and dark cells are clearly distinguished (binarized) as shown in FIG. 15. Further, characters and other information recorded in the QR code Ca can be decoded and read. For example, suppose that the threshold value related to dark light determination is set to 128 relative to 256 gradations of gray scale. In this case, when the brightness of the cell M1a described above is about 85 relative to 256 gradations (67%), the cell M1a is determined to be the dark color cell. When the brightness of the cell M2a described above is about 170 relative to 256 gradations (33%), the cell M2a is determined to be the bright color cell.

As described above, in the information code reading system 10 according to the present embodiment, the control unit 21 of the information code display device 20 generates multiple different similar code images (P41, P42, P43) of the similar codes (Cb, Cc, Cd) so that (i) the cell arrangement structure of each similar code is the same as the cell arrangement structure in the code area of the information code to be displayed, and (ii) the dark color cell having the first brightness and the light color cell having the second brightness are generated and arranged to differ the brightness of partial cells from one another. Among the cells constituting each of multiple different similar codes, a cell corresponding to a position of a dark color cell of the information code to be displayed is defined as a dark color forming cell (M1b, M1c, M1d), and a cell corresponding to a position of a light color cell of the information code to be displayed is defined as a light color forming cell (M2b, M2c, M2d). The similar code images are generated as follows. For the dark color forming cells located at the same position relative to the code area, a quantity of the similar codes in which the dark color cells having the first brightness are generated is greater than a quantity of the similar codes in which the light color cells having the second brightness are generated. For the light color forming cells located at the same position relative to the code area, a quantity of the similar codes in which the light color cells having the second brightness are generated is greater than a quantity of the similar codes in which the dark color cells having the first brightness are generated. The display module 24 cyclically displays generated similar code images on the display screen 24a with the code area as a reference position. In the information code reading device 30, the image capturing unit 32 captures an image of the display screen 24*a* with the exposure time longer than the cycle of the cyclic display. Then, the control unit 31 decodes and read the information code, in the decoding process, from the image captured by the image capturing unit 32.

When the display screen 24*a* of the information code display device 20 is simply photographed with normal exposure time, only one similar code image is captured and the whole information code to be displayed is not captured. In the above configuration, the information code reading device 30 photographs the display screen 24*a* with an exposure time longer than the cycle of the cyclic display. Thus, an image in which entire similar code images overlap with one another can be obtained. Since the information code to be displayed is formed in the code area of the captured image by distinguishing the dark and light level based on the above-described first brightness and second brightness, the information code can be read regardless of the cyclic display speed. Therefore, duplication of the information code displayed on the screen can be prevented.

In the present embodiment, for the information code to be displayed, three similar codes Cb, Cc, Cd are generated so that each cell in the partial code area is the same as the information code to be displayed and each cell in the remaining code area is different from the information code to be displayed. Alternatively, four or more (preferably an odd number) similar codes may be generated. Each similar code image may be generated without defining the change area Sb.

In one modification of the present embodiment, instead of generating each similar code by arranging the dark color cell having the first lightness and the light color cell having the second lightness, each similar code may be generated by arranging additive color mixture (RGB color) cells. For example, in multiple similar codes, the dark color forming cells located at the same position are unified as one of a red cell, a green cell, or a blue cell, and the light color forming cells located at the same position are generated in color mixed manner to include at least two of a red cell, a green cell, or a blue cell. Then, for the captured images obtained by cyclically displaying each similar code image in the second image capturing process, the red cell, the green cell, and the blue cell, which is unified by the same color is determined to be the dark cell, and the mixed color cell is determined to be the bright cell. By distinguishing (binarizing) the dark and light color cells as described above, the information code to be displayed can be generated. In this configuration, when the display screen 24*a* of the information code display device 20 is simply photographed with normal exposure time, only one similar code image is captured and the whole information code to be displayed is not captured. Therefore, duplication of the information code displayed on the screen can be prevented. In the present modification, each dark color forming cell is unified as one of a red cell, a green cell, or a blue cell. Alternatively, each dark color forming cell may be unified as one of a first combination cell in which the red cell is combined with the green cell, a second combination cell in which the green cell is combined with blue cell, or a third combination cell in which predetermined color type cells are combined. In this case, for the captured image obtained by capturing the multiple different similar code images cyclically displayed in the second image capturing process, the information code to be displayed is generated so that the cell provided with combination cell in which predetermined color cells are combined configures the dark color cell.

It should be understood that the present disclosure is not limited to the above-described embodiments and modifications, and may be implemented as follows. In the reading process, the second image capturing process may be performed without performing the first image capturing process, that is, by eliminating the processes of S101 and S103.

In the present embodiment, the exposure time in the second image capturing process is set to have the capturing frequency of about 1 time/s. Alternatively, the exposure time may be properly set depending on a quantity of the partial code images or the similar code images, the surrounding environment, etc. For example, the exposure time may be set to about integral multiple, that is, about several times or about several tens of times of the cycle of the cyclic display.

In the determination process of S113 according to the present embodiment, existence of the predetermined brightness difference is determined based on the brightness of each dark color cell. Alternatively, existence of the predetermined brightness difference may be determined based on the brightness of each light color cell.

The information code to be displayed is not limited to the QR code. Alternatively, a different type information code including dark color cells and light color cells, for example, two-dimensional codes such as a data matrix code or a maxi code may be provided as the information code. Alternatively, one-dimensional code such as a bar code may be provided as the information code.

The present disclosure is not limited to a configuration in which the information code reading device 30 is provided in a store that provides the predetermined service and a user such as a consumer who receives the service carries the information code display device 20. Alternatively, the information code display device 20 may be provided in a store and the user may carry the information code reading device 30. In this case, the partial code images, the similar code images, or the like corresponding to the service are cyclically displayed on the information code display device 20 provided in the store. The information code reading device 30 carried by the user reads the target information code from the information code display device 20 by capturing the display screen that cyclically displays the images as described above with a long exposure time. Herein, the target information code corresponds to the information code to be displayed. Thus, it is possible to determine authentication, or provide or receive services based on the reading result.

In the present disclosure, the partial code image generation unit generates multiple different partial code images so that a cell corresponding to a predetermined range of the information code to be displayed is included in two or more partial code images.

For example, multiple partial code images different from one another are generated by dividing the information code to be displayed into multiple cells so that the multiple cells are not overlapped with one another. Then, the generated partial code images are displayed in the cyclic manner. When the partial code images are photographed with long exposure time, an increase in the quantity of divided images causes an increase of brightness of the dark color cell (the brightness of dark color cell becomes close to the brightness of light color cell). Thus, the contrast between the dark color cells and the light color cells decreases, thereby causing a failure in reading of the information code. In the present disclosure, the partial code images are generated so that a certain cell corresponding to a predetermined range of the information code to be displayed is included in two or more partial code images. With this configuration, even if the partial code images are captured with a long exposure time, the brightness of dark color cell at least in the predetermined range is less likely to increase. As a result, it is possible to suppress reading failure due to a decrease in contrast between the dark color cells and the light colored cells.

In the information code reading device according to the present disclosure, the brightness of each cell of the information code captured by the image capturing unit may be calculated by the brightness calculation unit, and the information of each cell included in the predetermined range may be acquired by the acquisition unit. Then, based on the brightness calculated by the brightness calculation unit and the information of each cell included in the predetermined range acquired by the acquisition unit, the authentication unit may authenticate the information code captured by the image capturing unit 32.

With this configuration, in the image obtained by capturing the display screen on which the partial code images are cyclically displayed with a long exposure time, the brightness of the dark color cells in the above-described predetermined range is more likely to become different from the brightness of the dark color cells in the remaining range by a predetermined level. In the image obtained by capturing a counterfeit code with a long exposure time, a predetermined difference is not generated between the brightness of the dark color cells in the predetermined range and the brightness of dark color cells in the remaining range. Herein, the counterfeit code may be generated by illegally acquiring information recorded in the genuine information code. Thus, based on the brightness calculated by the brightness calculation unit and the information of each cell included in the predetermined range acquired by the acquisition unit, the authentication can be determined for the information code captured by the image capturing unit.

In the present disclosure, the information of cells included in the predetermined range may be recorded in the information code. The acquisition unit may acquire information of cells included in the predetermined range from the decoding result output from the decoding unit. This configuration eliminates a process to acquire the information of predetermined range in advance, and also makes it possible to change the predetermined range for each information code to be displayed. Thus, the present disclosure makes it more difficult to forge the information code and improves an authentication accuracy.

In the information code display device according to another aspect of the present disclosure, a similar code image generation unit generates multiple similar code images to be different from one another. In the generated multiple similar code images, a cell arrangement structure of each of the multiple similar codes is same as a cell arrangement structure of a code area of an information code to be displayed, and a dark color cell having a first brightness and a light color cell having a second brightness are generated and arranged so that a brightness of an area of one similar code image is different from one another. Among entire cells configuring each of multiple similar codes corresponding to the multiple similar code images, a cell corresponding to a position of a dark color cell of the information code to be displayed is defined as a dark color forming cell and a cell corresponding to a position of a light color cell of the information code to be displayed is defined as a light color forming cell. In the multiple similar codes, for the dark color forming cells located at a same position relative to the code area, a quantity of the similar codes in which the dark color cells having the first brightness are generated is greater than a quantity of the similar codes in which the light color cells having the second brightness are generated. In the multiple similar codes, for the light color forming cells located at a same position relative to the code area, a quantity of the similar codes in which the light color cells having the second brightness are generated is greater than a quantity of the similar codes in which the dark color cells having the first brightness are generated. The display unit cyclically displays generated similar code images on the display screen with the code area as a reference position. In the information code reading device, the image capturing unit captures an image of the display screen with the exposure time longer than the cycle of the cyclic display. Then, the decoding unit decodes and read the information code captured by the image capturing unit.

With above configuration, when the display screen of the information code display device is simply photographed with normal exposure time, only one similar code image is captured and the whole information code to be displayed is not captured. In the above configuration, the information code reading device photographs the display screen with an exposure time longer than the cycle of the cyclic display. Thus, an image in which entire similar code images overlap with one another can be obtained. Since the information code to be displayed is formed in the code area of the captured image by distinguishing the dark and light level based on the above-described first brightness and second brightness, the information code can be read regardless of the cyclic display speed. Therefore, duplication of the information code displayed on the screen can be prevented.

The control unit 21 corresponds to a partial code image generation unit and a similar code image generation unit. The drawing frame generation module 23 corresponds to the partial code image generation unit. The display module 24 corresponds to a display unit. The display controller 25 also corresponds to the display unit. The control unit 31 corresponds to a decoding unit, an acquisition unit, a brightness calculation unit, and an authentication unit. The QR codes C and Ca correspond to the information codes to be displayed.

It is noted that a flowchart or the process of the flowchart in the present disclosure includes multiple steps (also referred to as sections), each of which is represented, for example, as S101. Further, each step can be divided into several sub-steps while several steps can be combined into a single step.

In the above embodiment, each of the control unit or controller may be provided separately as one or more than one controller or may be provided integrally as one or more than one controller. Such a controller and method thereof described in the present disclosure may be implemented by one or more than one special-purpose computer. Such a special-purpose computer may be created (i) by configuring a memory and a processor programmed to execute one or more particular functions embodied in computer programs, or (ii) by configuring a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits. Further, the computer program may be stored in a computer-readable non-transitory tangible storage medium as instructions executed by a computer.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An information code reading system comprising:
an information code display device; and
an information code reading device,
wherein
the information code display device includes:
  a partial code image generation unit configured to generate, corresponding to an information code to be displayed, multiple partial code images that are different from one another, a code area of the information code to be displayed including multiple cells and each of the cells being included in at least one of the multiple partial code images, each partial code image being generated by removing a part of the cells from the code area, and the parts of the cells being removed being different from one another among the multiple partial code images; and
  a display unit configured to display the multiple partial code images generated by the partial code image generation unit on a display screen in a cyclic manner with the code area as a reference, and
the information code reading device includes:
  an image capturing unit capturing, as an information code, the multiple partial code images cyclically displayed on the display screen in an overlapped manner, an exposure time of the image capturing unit being set to be longer than a cycle of cyclic display of the multiple partial code images so that the multiple partial code images captured in one capturing cycle by the image capturing unit connected together constitute the information code; and
  a decoding unit decoding the information code captured by the image capturing unit.

2. The information code reading system according to claim 1, wherein
the partial code image generation unit generates the multiple partial code images different from one another by including a cell of a predetermined range of the information code to be displayed in two or more of the multiple partial code images.

3. The information code reading system according to claim 2, wherein
the information code reading device includes:
  a brightness calculation unit configured to calculate a brightness of the information code captured by the image capturing unit in units of cells;
  an acquisition unit configured to acquire information related to the cell of the predetermined range; and
  an authentication unit configured to authenticate, based on the brightness calculated by the brightness calculation unit and the information related to the cell of the predetermined range acquired by the acquisition unit, the information code captured by the image capturing unit.

4. The information code reading system according to claim 3, wherein
the information related to the cell of the predetermined range is recorded in the information code captured by the image capturing unit, and
the acquisition unit acquires the information related to the cell of the predetermined range based on a decoding result of the information code captured by the image capturing unit, which is output from the decoding unit.

5. An information code reading system comprising:
an information code display device; and
an information code reading device,
wherein
the information code display device includes:
  a similar code image generation unit configured to generate multiple similar code images that are different from one another, a cell arrangement structure of each of multiple similar codes in the generated multiple similar code images being the same as a cell arrangement structure of a code area of an information code to be displayed, and a dark color cell having a first brightness and a light color cell having a second brightness being generated and arranged so that a brightness of an area of one of the similar code images is different from that of another of the similar code images; and
  a display unit configured to display the multiple similar code images generated by the similar code image generation unit on a display screen in a cyclic manner with the code area as a reference,
wherein,
among entire cells configuring each of the multiple similar codes corresponding to the multiple similar code images, a cell corresponding to a position of a dark color cell of the information code to be displayed is defined as a dark color forming cell and a cell corresponding to a position of a light color cell of the information code to be displayed is defined as a light color forming cell,
in the multiple similar codes, for the dark color forming cells located at a same position relative to the code area, a quantity of the similar codes in which the dark color cells having the first brightness are generated is greater than a quantity of the similar codes in which the light color cells having the second brightness are generated, and
in the multiple similar codes, for the light color forming cells located at a same position relative to the code area, a quantity of the similar codes in which the light color cells having the second brightness are generated is greater than a quantity of the similar codes in which the dark color cells having the first brightness are generated, and
the information code reading device includes:
  an image capturing unit capturing, as an information code, an image of the display screen with an exposure time set to be longer than a cycle of cyclic display of the multiple similar code images; and
  a decoding unit decoding the information code captured by the image capturing unit.

6. An information code reading system comprising:
an information code display device; and
an information code reading device,
wherein
the information code display device includes:
  a processor configured to generate, corresponding to a target information code, multiple partial code images that are different from one another, a code area of the target information code including multiple cells and each of the cells being included in at least one of the multiple partial code images, each partial code image being generated by removing a part of the cells from the code area, and the parts of the cells being removed being different from one another among the multiple partial code images; and a display configured to display the generated multiple partial code images on a screen of the display in a cyclic manner with the code area as a reference, and the information code reading device includes a processor configured to:

capture, as a target information code, the multiple partial code images displayed on the screen of the display in an overlapped manner, an exposure time being set to be longer than a cycle of cyclic display of the multiple partial code images so that the multiple partial code images captured in one capturing cycle connected together constitute the target information code; and decode the captured multiple partial code images and read information about the target information code.

7. An information code reading system comprising:

an information code display device; and an information code reading device, wherein:

the information code display device includes:

a partial code image generation unit configured to generate, corresponding to an information code to be displayed, multiple partial code images that are different from one another, a code area of the information code to be displayed including multiple cells and each of the cells being included in at least one of the multiple partial code images, each partial code image being generated by removing a part of the cells from the code area, and the parts of the cells being removed being different from one another among the multiple partial code images; and a display unit configured to display the multiple partial code images generated by the partial code image generation unit on a display screen in a cyclic manner with the code area as a reference;

the information code reading device includes:

an image capturing unit capturing, as an information code, an image of the display screen with an exposure time set to be longer than a cycle of cyclic display of the multiple partial code images; and a decoding unit decoding the information code captured by the image capturing unit;

the partial code image generation unit generates the multiple partial code images different from one another by including a cell of a predetermined range of the information code to be displayed in two or more of the multiple partial code images; and the information code reading device further includes:

a brightness calculation unit configured to calculate a brightness of the information code captured by the image capturing unit in units of cells;

an acquisition unit configured to acquire information related to the cell of the predetermined range; and an authentication unit configured to authenticate, based on the brightness calculated by the brightness calculation unit and the information related to the cell of the predetermined range acquired by the acquisition unit, the information code captured by the image capturing unit.

8. The information code reading system according to claim 7, wherein the information related to the cell of the predetermined range is recorded in the information code captured by the image capturing unit, and the acquisition unit acquires the information related to the cell of the predetermined range based on a decoding result of the information code captured by the image capturing unit, which is output from the decoding unit.

\* \* \* \* \*